United States Patent [19]

Pindat

[11] Patent Number: 5,002,161
[45] Date of Patent: Mar. 26, 1991

[54] SPRING FOR A DISC BRAKE AND DISC BRAKE EQUIPPED WITH SUCH A SPRING

[75] Inventor: Michel Pindat, Pantin, France

[73] Assignee: Bendix France, Drancy, France

[21] Appl. No.: 384,893

[22] Filed: Jul. 24, 1989

Related U.S. Application Data

[63] Continuation of Ser. No. 200,756, May 31, 1988, abandoned.

[30] Foreign Application Priority Data

Jun. 2, 1987 [FR] France ............... 87 07677

[51] Int. Cl.⁵ ............................................. F16D 65/02
[52] U.S. Cl. ................................................. 188/73.38
[58] Field of Search ............... 188/73.35, 73.36, 73.37, 188/73.38

[56] References Cited

U.S. PATENT DOCUMENTS

| | | | |
|---|---|---|---|
| 3,298,469 | 1/1967 | Robinette | 188/73.38 X |
| 3,937,304 | 2/1976 | Brix | 188/73.38 |
| 4,415,068 | 11/1983 | Gumkowski et al. | 188/73.38 X |
| 4,624,344 | 11/1986 | Gerard et al. | 188/73.38 X |
| 4,669,583 | 6/1987 | Mery | 188/73.38 |
| 4,673,065 | 6/1987 | Gerard et al. | 188/73.38 |

FOREIGN PATENT DOCUMENTS

| | | |
|---|---|---|
| 190956 | 8/1986 | European Pat. Off. . |
| 203841 | 12/1986 | European Pat. Off. . |
| 3533931 | 3/1987 | Fed. Rep. of Germany ... 188/73.38 |
| 2295300 | 7/1976 | France . |
| 2399 | 6/1979 | France . |
| 2582365 | 11/1986 | France . |
| 109836 | 8/1980 | Japan ........................... 188/73.38 |
| 2012012 | 7/1979 | United Kingdom . |
| 2109491 | 6/1983 | United Kingdom ............ 188/73.38 |
| 2150241 | 6/1985 | United Kingdom . |

*Primary Examiner*—George E. A. Halvosa
*Attorney, Agent, or Firm*—Larry J. Palguta; Ken C. Decker

[57] ABSTRACT

The spring comprises a mounting portion 42 snapped into the arch of the caliper of a sliding-caliper disc brake, and rigid portions 58, 60 for exerting forces on support plates 26, 28 of friction members interacting with the disc of the brake. According to the invention, slits 90, 92 parallel to the rigid portions 58, 60 reduce the rigidity of the central part of these. Thus, when the friction members become worn and approach the center of the spring, an intensification of the forces exerted on the support plates by the spring is avoided. A lug 100 makes it possible to keep the rigid portion 58 away from a fragile part of the brake when the friction members are removed from the latter. The invention is used on sliding-caliper disc brakes.

12 Claims, 3 Drawing Sheets

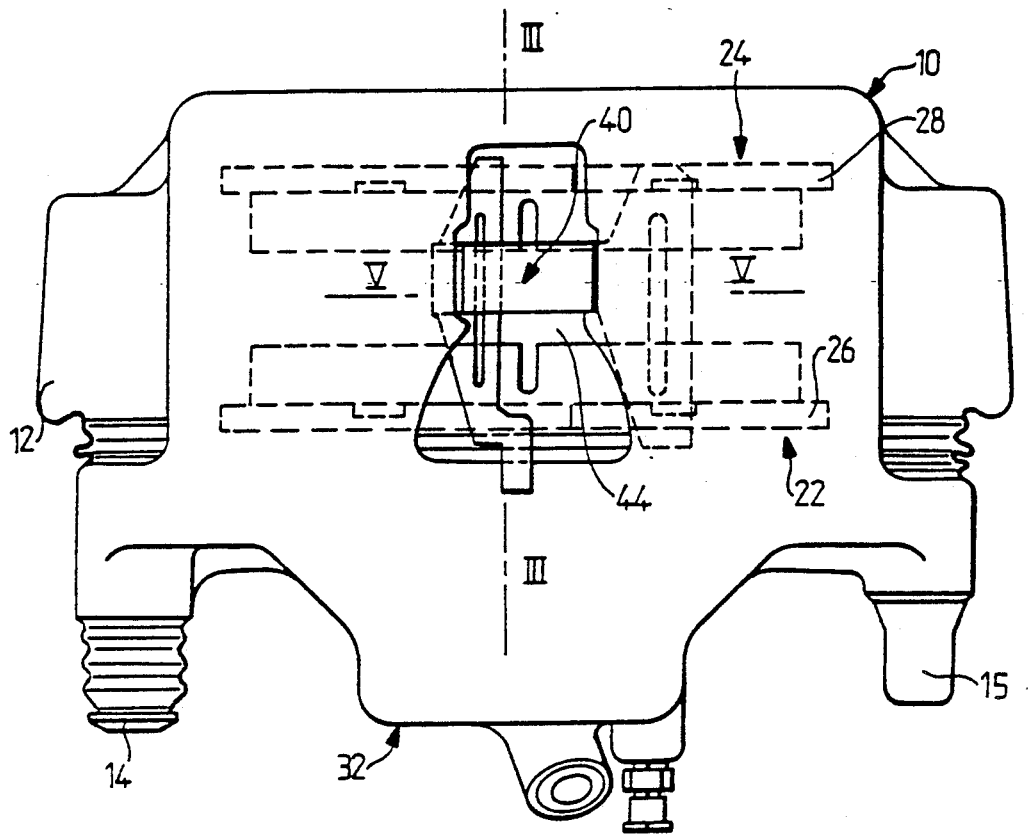
FIG_1
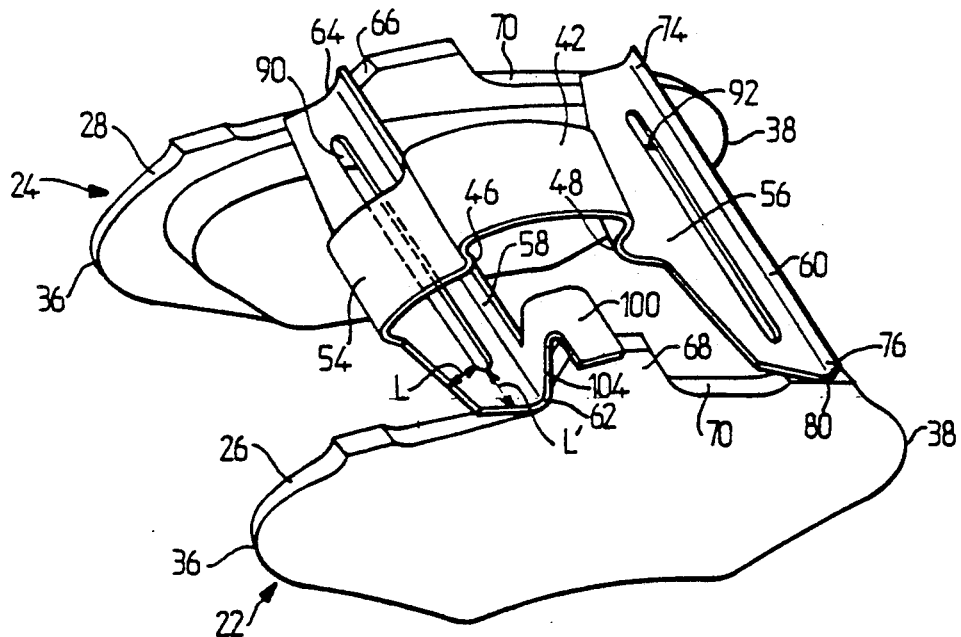
FIG_2

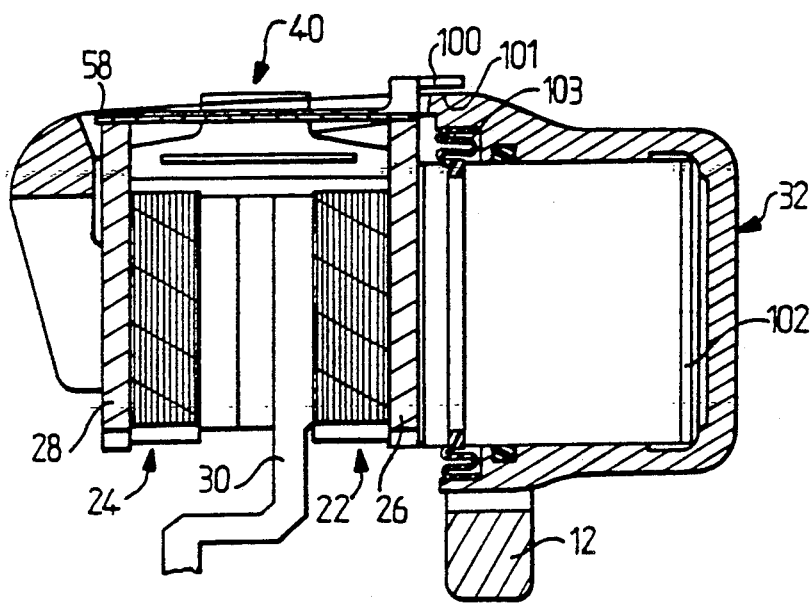
FIG_3
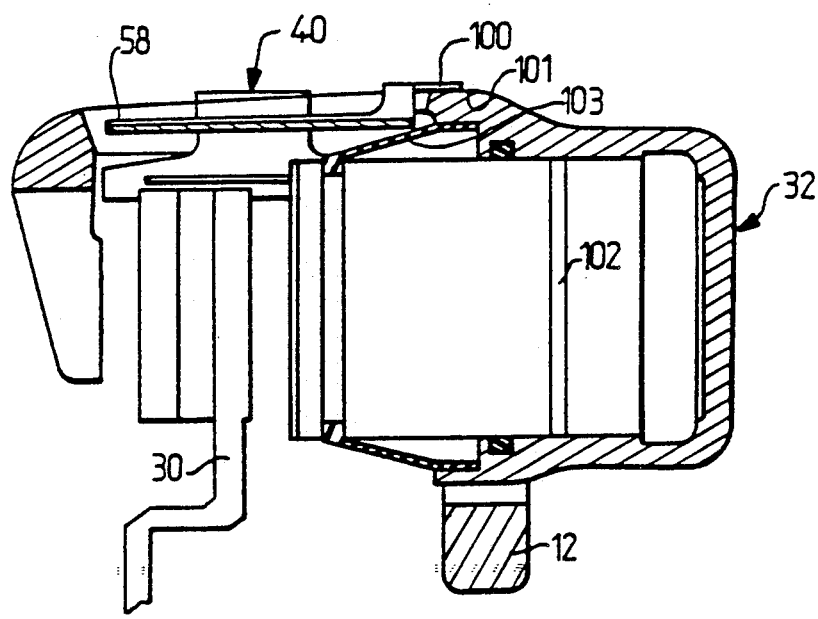
FIG_4

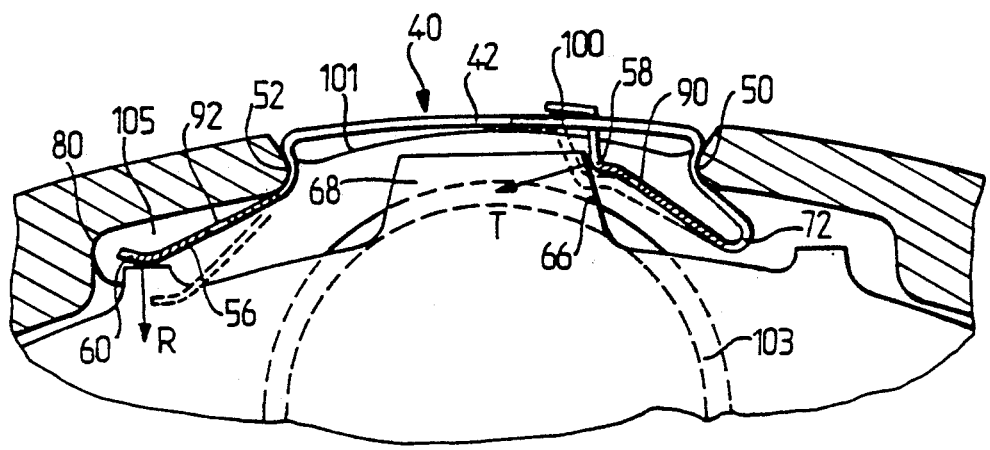
FIG_5
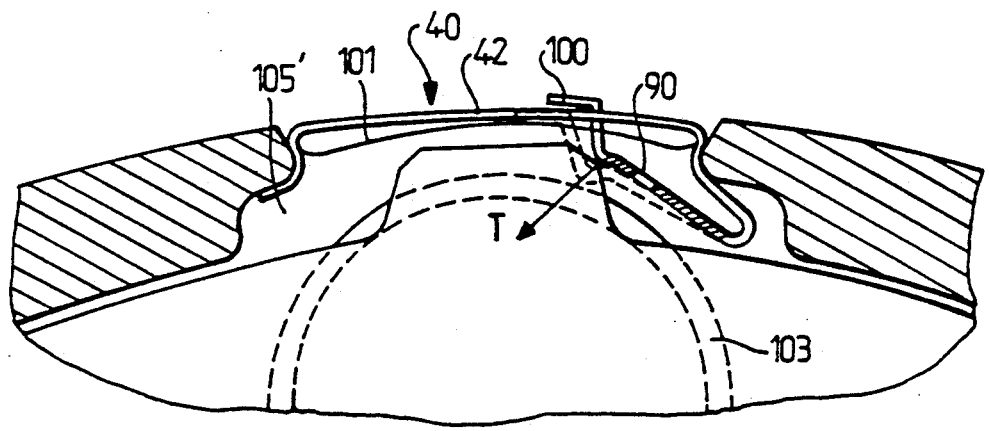
FIG_6

SPRING FOR A DISC BRAKE AND DISC BRAKE EQUIPPED WITH SUCH A SPRING

The subject of the invention is a spring for a sliding-caliper disc brake and a disc brake equipped with such a spring.

The invention is aimed more particularly at a spring intended for equipping a disc brake, the caliper of which slides relative to a fixed support by means of at least two matching axial-sliding surfaces which are formed on the caliper and on the fixed support and which are kept in contact by elastic means.

French Patent 2,582,365 makes known a spring for a disc brake of the type having a caliper mounted on a fixed support, slideably parallel to the axis of a rotating disc by means of at least two axial-sliding surfaces formed on the caliper and on the fixed support and kept elastically in contact, and two friction members received in an anchored and axially slideable manner in an orifice in the fixed support, in order to come into frictional engagement with the opposite faces of the disc during the actuation of a brake motor, the spring being mounted elastically in an orifice made in the arch of the caliper and exerting on the support plates of the friction members a radial force directed substantially along a radius of the disc and towards the axis of the latter and a tangential force perpendicular to the radial force, in order to stress each of the friction members tangentially relative to the circumference of the disc so as to ensure that these are retained in a preferred lateral position. This spring is characterized in that it consists of a bent metal leaf comprising a mounting portion connected elastically to two rigidly acting portions by means of its sides arranged at a circumferential distance from one another, a first rigid portion extending parallel to the axis of the disc and being capable of stressing the support plates elastically in a substantially circumferential direction by means of its two free ends, a second of the rigid portions likewise extending parallel to the axis of the disc and being capable of stressing the support plates elastically substantially radially towards the axis of the disc by means of its two free ends.

With such an arrangement, the spring retained via its mounting portion in the orifice made in the arch of the caliper stresses the support plates by means of each of its rigid portions, and the elastic connections between the mounting portion and each of the two rigidly acting portions can be changed, as required, in order to obtain the desired radial and tangential forces.

Each rigid portion of the spring described in the abovementioned patent has two free ends, each of which bears on an associated support plate of a friction member. The effect of the progressive wear of the latter is to bring it nearer to the mid-plane of the brake spring, thus shifting the contact zone of the rigid portion with the support plate from one free end of the rigid portion towards the middle part of the latter. This middle part is joined to the associated elastic portion of the spring according to a profile which gives the rigid part a width which increases, in the axis of the disc, from one free end towards the middle part of the rigid portion. The effect of the greater width of this part is to increase its rigidity locally. The result of this is that the force exerted by the rigid portion on an associated friction member increases at the same time as the wear of the lining of the friction member. The friction arising from this when the brake motor pushes the linings towards the disc during braking thus increases with the wear of the linings. Excessive friction can impede the sliding of the caliper to such an extent that asymmetric wear of the linings occurs. Such wear must be prevented because it results in premature replacement of the friction members. Moreover, this increased rigidity can cause the middle part of the rigid portion to be crushed under the reaction force received from the friction members. The permanent deformation of the spring which results from this must also be prevented.

Furthermore, when a disc brake equipped with the spring described in the abovementioned patent is used and the friction members of the brake are removed, for example in order to exchange them for new friction members, it has been seen that a free end of at least one of the fixed portions of the spring can bear on a sealing cap or bellows made of flexible material of the piston of the brake motor, this cap being stretched towards the disc in proportion to the wear of the lining of the friction member actuated directly by this brake motor. This contact between the spring and this cap made of flexible material can cause damage to the cap and consequently diminished sealing of the brake motor.

It is therefore an object of the present invention to provide a spring for the disc brake of the type described in the abovementioned patent which does not have the disadvantages stated above.

According to the present invention, there is provided a spring for a disc brake of the type having a caliper mounted on a fixed support, slideably parallel to the axis of a rotating disc, and two friction members received in an anchored and axially slideable manner in an orifice in the fixed support, in order to come into frictional engagement with the opposite faces of the disc during the actuation of a brake motor, the spring being mounted elastically in an orifice made in the arch of the caliper so as to load each of the friction members, this spring consisting of a bent metal leaf having a mounting portion connected by means of an elastic portion to at least one rigidly acting portion extending parallel to the axis of the disc, in order to stress the friction members elastically, this spring being characterized in that a transverse slit parallel to the rigid portion is cut out in the elastic portion near this rigid portion, so as to reduce the load exerted by the spring on the friction members when these approach the mid-plane of the spring as a result of the wear of these members.

To avoid damaging the cap of the motor of a brake equipped with a spring of the type described in the precharacterizing clause, the invention provides a spring for a disc brake of the type having a caliper mounted on a fixed support, slideably parallel to the axis of a rotating disc, and two friction members received in an anchored and slideable manner in an orifice in the fixed support, in order to come into frictional engagement with the opposite faces of the disc during the actuation of a brake motor, the spring being mounted elastically in an orifice made in the arch of the caliper so as to load each of the friction members, this spring consisting of a bent metal leaf having a mounting portion connected by means of an elastic portion to a rigidly acting portion extending parallel to the axis of the disc, in order to stress the friction members elastically, this spring being characterized in that a lug projects from the rigidly acting portion in such a way that, when the friction members are removed from the brake, this lug comes elastically up against a brake surface designed to keep the rigid portion away from contact with a fragile part of the brake.

The invention will now be described by way of example with reference to the accompanying drawings, in which:

FIG. 1 is an elevation view of a disc brake equipped with a spring according to the invention;

FIG. 2 is a perspective view illustrating the interaction of the spring according to the invention with friction members of the brake of FIG. 1;

FIG. 3 is a view in partial section along the sectional line III-III of FIG. 1;

FIG. 4 is a view similar to that of FIG. 3, taken when the brake of FIG. 1 is free of its friction members;

FIG. 5 is a view in partial section along the sectional line V—V of FIG. 1, illustrating the functioning of the spring according to the invention; and FIG. 6 is a view similar to that of FIG. 5, illustrating the functioning of another embodiment of the spring according to the invention.

The disc brake shown in FIG. 1 is of the type having a caliper 10 mounted slideably on a fixed support 12 by means of two axial columns 14 and 15. The disc brake also possesses two friction members 22 and 24 equipped respectively with support plates 26 and 28 and capable of coming into frictional engagement with a rotating disc 30 (see FIGS. 3 and 4) during the actuation of a hydraulic brake motor 32. The friction members 22 and 24 are received in an anchored and slideable manner in an orifice made in the fixed support 12. In the example illustrated, the two friction members 22 and 24 each have ends 36 and 38 having a circular profile interacting with matching circular profiles of the fixed support 12. Such a type of friction member is described and illustrated in more detail in European Patent EP-A-0 002,399. With this type of friction member, it is desirable to exert on the support plate a tangential force which keeps the latter in a preferred lateral position up against the inside of the orifice made in the fixed support 12.

The disc brake shown in FIG. 1 is equipped with a spring 40 produced according to the present invention. Reference will be made particularly to FIGS. 2 and 5 for the description of the spring 40. The spring 40 consists of a bent metal leaf which comprises amounting portion 42 having the general shape of the Greek letter omega and mounted elastically in an orifice 44 made in the arch of the caliper 10. The sides 46 and 48 arranged at a circumferential distance from one another and forming the pinched parts of the letter omega interact with edges 50 and 52 of the orifice 44 which are arranged at a circumferential distance from one another. The sides 46 and 48 arranged at a circumferential distance from one another are extended by elastic portions 54 and 56 respectively These elastic portions 54 and 56 terminate in two r id portions 58 and 60 which extend axially on either side of the corresponding elastic portions 54 and 56 respectively. A first rigid portion 58 associated with the elastic portion 54 has two free ends 62, 64 which stress each of the support plates 26, 28 substantially circumferentially (see FIG. 5) by interacting with bearing surfaces 66 provided on the flank of a projection 68 formed on the peripheral side 70 of each of the support plates 26 and 28. As it can be seen in FIGS. 2 and 5, the rigid portion 58 has the form of a gutter, the corresponding elastic portion 54 forming a pronounced rounded fold 72 (see FIG. 5), so as to allow the rigid portion 58 to stress the projection 68 outside the region occupied by the friction members and by the disc. In a similar way, the rigid portion 60 has the form of a gutter and possesses two free ends 74 and 76 which interact with substantially circumferential bearing surfaces 80 formed on the peripheral side 70 of the support plates 26 and 28. Referring to FIG. 5, it will be seen that, by means of the fold 72, the first rigid portion 58 exerts a substantially tangential force T on the surface 66. In a similar way, the second rigid portion 60 exerts a substantially radial force R on the surface 80.

The function of these two forces is explained in detail in the abovementioned French Patent no. 2,582,365, to which reference may be made in order to obtain particulars on this subject. In general terms, the spring 40 snapped into the orifice 44 in the arch of the caliper by means of its omega-shaped portion ensures, as a result of these forces, the spring functions of anti-noise and of keeping the friction members in the preferred lateral position.

However, with the spring described in the abovementioned patent, it has been found that the force exerted by the rigid portions on the support plates of the friction members increases when these members become worn. In fact, the members then approach the mid-plane of the spring, and the part of each rigid portion which loads the support plates is that located opposite the elastic portion connecting each rigid portion to the mounting portion 42. Because the rigid portion is widened in this region, the rigidity of the spring and therefore the forces exerted on the support plates increase.

This results in adverse effects. First of all, there is then an increase in the friction opposing the sliding of the friction members and of the sliding caliper, a possible consequence of this being asymmetric wear of the linings of the friction members, which brings about premature replacement of these members. Furthermore, the reaction of the friction members on the part of the spring having increased rigidity can cause crushing of the latter, that is to say permanent deformation of the spring. This then has to be replaced.

According to the present invention, these disadvantages are overcome by providing in the spring, parallel to the axis of the disc on which the brake of FIG. 1 acts, transverse slits 90, 92 made near the rigid portions 58, 60 respectively in the region of the elastic portions 54, 56 respectively (see FIG. 2). The effect of these slits is to reduce the rigidity of the spring in its central part in line with the elastic portions 54 and 56. The forces exerted on the support plates 26, 28 by the spring when the friction members approach the mid-plane of the spring in proportion to their wear are then reduced in comparison with the forces which would be exerted if these slits were absent. This reduction in forces makes it possible to avoid the disadvantages mentioned above.

It should also be noted that, since the weight of the friction members decreases when their wear increases, this decrease can be taken into account in the adjustment of the rigidity of the spring by means of these slits, so as to reduce even further the friction opposing the proper functioning of the disc brake equipped with the spring according to the invention. A person skilled in the art will know how to take advantage of this remark in order to set the dimensions and position of these slit$ correctly, simply by putting his usual knowledge into practice. It will be seen, in this respect, that the shorter the distance "L" (see FIG. 2) which, for example, separates one end of the slit 90 at right angles from the contour of the elastic portion 54, the lower the rigidity of the central part of the rigid portion 58. Likewise, the greater the radius of curvature of the rounded fold 72, the more flexible the rigid portion 58 as a whole becomes.

It will also be seen from FIG. 2 that a lug 100 projects laterally and vertically from one end of the rigid portion 58 of the spring. Referring to FIGS. 3 and 4 of the drawing, it is clear that this lug projects from the spring on the same side as the brake motor 32.

It emerges from the axial section in FIG. 3, which shows a disc brake equipped with friction members and with the spring according to the invention, that, here, this lug is set apart from the upper surface 101 of the brake motor 32 because of the reaction to the force T exerted on the rigid portion 58 of the spring by the support plates 26 and 28 (see also FIG. 5).

The brake motor shown in section in FIGS. 3 and 4 comprises a piston 102 designed to act on the support plate 26 of the friction member 22 during braking. A cap 103 made of flexible material ensures the sealing of the cylinder of the motor 32 receiving the piston, when the latter slides in the cylinder during braking.

In FIG. 4, the disc brake is shown without its friction members, the piston extended and the cap 103 unfolded, as occurs when a repair is carried out on the brake to replace worn friction members. In this state, the rigid portion 58 of the spring 40 is no longer pushed upwards by the support plates on which it rested before the friction members were removed. If the spring is not equipped with the lug 100, as in the spring described in the abovementioned patent, the rigid portion 58 can then accidentally come to bear on the cap 103 at the risk of shearing this because it is made of a breakable material, such as a synthetic rubber.

The lug 100 makes it possible to prevent this accident. In fact, it emerges from FIG. 4 and from FIG. 5 (the position represented by broken lines) that, when friction members are absent, the lug comes to rest on the upper surface 101 of the brake motor, thus keeping the rigid portion 58 of the spring away from the cap 103 of the brake motor.

FIG. 2 shows that the lug 100 and the slit 90 are formed on either side of the rigid portion 58. The lug first projects vertically (as seen in FIG. 2) from this rigid portion by means of a substantially radial connecting part 104, from the upper part of which extends the plane and horizontal end of the actual lug 100, which projects laterally from the support plate 26 towards the upper surface 101 of the brake motor 32.

FIG. 6 is similar to FIG. 5 and illustrates another embodiment of the spring according to the invention. This differs from that of FIG. 5 in that it is simplified by the elimination of the elastic portion 56 and the rigid portion 60 which, in the embodiment of FIG. 5, exerts substantially radial forces on the support plates. In fact, the elimination of these forces may be considered acceptable if the force exerted by the other rigid portion of the spring on the appropriately modified bearing surface 66 is oriented in a certain way. Furthermore, the elimination of this part 56, 60 of the spring makes it possible to reduce the receptacle 105 made in the arch of the caliper 10 (see FIG. 5) to allow the movement of this part. In the embodiment of FIG. 6, the arch 10 of the caliper has a smaller receptacle 105' here, the effect of this being to improve the robustness of the brake equipped with the spring according to the invention.

I claim:

1. A spring for a disc brake of the type having a caliper mounted on a fixed support with the caliper slidable parallel to the axis of a rotating disc, and two friction members equipped with support plates received in an anchored and axially slidable manner in an open area in the fixed support in order to come into frictional engagement with opposite faces of the disc during actuation of a brake motor, said spring having a mid-plane parallel to the faces of the disc and being mounted elastically in an orifice in an arch of the caliper so as to exert an elastic force on the support plates of each of the friction members, the spring comprising a bent metal leaf having a mounting portion connected by means of an elastic portion to at least one rigidly acting portion extending parallel to the axis of the disc in order to exert said elastic force on the support plates of the friction members, the spring being characterized in that an elongated, narrow transverse slit parallel to the rigidly acting portion is cut out in the elastic portion between the mounting portion and the rigidly acting portion and near the rigidly acting portion, the slit comprising an opening contained entirely in the elastic portion and which is defined by a continuous edge extending about the entire perimeter of the opening, so as to reduce both the elastic force exerted by the spring on the friction members and friction opposing the functioning of the brake when the friction members approach the mid-plane of the spring as a result of wear of the members, and the slit disposed symmetrically relative to said mid-plane.

2. The spring according to claim 1, characterized in that the rigidly acting portion exerts on the support plates of the friction members a substantially tangential force.

3. The spring according to claim 1, characterized in that the rigidly acting portion exerts on the support plates of the friction members a substantially radial force.

4. The spring according to claim 1, characterized in that the mounting portion is connected, by means of two sides arranged at a circumferential distance from one another, to two rigidly acting portions each associated with an elastic portion having a symmetrically disposed transverse slit parallel to the respective rigidly action portion.

5. The spring according to claim 4, characterized in that the rigidly acting portions exert on the support plates of the friction members substantially tangential and radial forces, respectively.

6. The spring according to claim 5, characterized in that a lug projects from a free end of one rigidly acting portion and extends substantially parallel to the axis of the disc and beyond the free end of the one rigidly acting portion, in such a way that, when the friction members are removed from the brake, the lug comes elastically to rest on an outer surface of the brake motor in order to keep the one rigidly acting portion away from contact with a fragile part of the brake formed by a cap made of breakable material and forming part of the brake motor.

7. The spring according to claim 6, characterized in that the lug is connected to the free end by means of a substantially radial connecting part.

8. The spring according to claim 6, characterized in that the associated transverse slit and the lug are arranged on either side of the one rigidly acting portion.

9. A spring for a disc brake of the type having a caliper mounted on a fixed support with the caliper slidable parallel to the axis of a rotating disc, and two friction members equipped with support plates received in an anchored and axially slidable manner in an open area in the fixed support in order to come into frictional engagement with opposite faces of said disc during actuation of a brake motor, the spring being mounted elastically in an orifice in an arch of the caliper so as to exert an elastic force on the support plates of each of the friction members, the spring having a spring axis parallel to the axis of the disc and comprising a bent metal leaf having a mounting portion connected by means of an elastic portion to a rigidly acting portion extending parallel to the axis of the disc in order to exert the elastic force on the support plates of the friction members, the mounting portion engaging edges of said orifice so that said spring is retained elastically in said orifice when the friction members are removed from the disc brake, the spring being characterized in that a lug projects from a free end of the rigidly acting portion in such a way that, when the friction members are removed from the brake and the spring retained elastically in the orifice, the lug engages a brake surface to provide a static stop which keeps the rigidly acting portion away from a contact with a fragile part of the brake formed by a cap made of breakable material and forming part of the brake motor, the lug located only on one side of said spring axis.

10. The spring according to claim 9, characterized in that the lug projects from the free end of the rigidly acting portion which is adjacent the brake motor.

11. The spring according to claim 10, characterized in that the lug extends substantially parallel to the axis of the disc and beyond the free end of the rigidly acting portion, to rest on an outer surface of the brake motor when the friction members are removed from the brake, the lug being connected to the free end by means of a substantially radial connecting part.

12. The spring according to claim 10, characterized in that an elongated, narrow transverse slit parallel to the rigidly acting portion and symmetrically disposed relative to a mid-plane of the spring parallel to the faces of the disc is cut out in the elastic portion between the mounting portion and the rigidly acting portion and near the rigidly acting portion, the slit comprising an opening contained entirely in the elastic portion and which is defined by a continuous edge extending about the entire perimeter of the opening, the lug and the transverse slit being arranged on either side of the rigidly acting portion.

* * * * *